(12) United States Patent
Bleier

(10) Patent No.: US 6,382,508 B1
(45) Date of Patent: May 7, 2002

(54) CONTACTING APPARATUS FOR A SMART CARD

(75) Inventor: Robert Bleier, Bad Wimpfen (DE)

(73) Assignee: Amphenol-Tuchel Electronics GmbH (DE)

( * ) Notice: Subject to any disclaimer, the term of this patent is extended or adjusted under 35 U.S.C. 154(b) by 0 days.

(21) Appl. No.: 09/208,253

(22) Filed: Dec. 9, 1998

(30) Foreign Application Priority Data

Dec. 10, 1997 (DE) .......................................... 197 54 914

(51) Int. Cl.⁷ ................................................. G06K 7/06
(52) U.S. Cl. ...................... 235/441; 235/486; 235/451; 235/479; 235/485
(58) Field of Search .................. 235/441, 486, 235/451, 475, 477, 479, 485, 492; 361/737

(56) References Cited

U.S. PATENT DOCUMENTS

| | | | | |
|---|---|---|---|---|
| 4,141,044 A | * | 2/1979 | Kistner et al. ............... | 235/475 |
| 4,258,253 A | * | 3/1981 | Fisher ......................... | 235/439 |
| 4,724,310 A | * | 2/1988 | Shimamura et al. ......... | 235/483 |
| 4,835,375 A | * | 5/1989 | Shimamura et al. ......... | 235/479 |
| 4,926,032 A | * | 5/1990 | Shimamura et al. ......... | 235/441 |
| 5,131,516 A | * | 7/1992 | Clough ....................... | 235/381 |
| 5,317,138 A | * | 5/1994 | Togawa ....................... | 235/440 |
| 5,378,884 A | * | 1/1995 | Lundstrom et al. .......... | 235/441 |
| 5,780,827 A | * | 7/1998 | Zolkos et al. ................ | 235/441 |
| 5,898,159 A | * | 4/1999 | Huang ......................... | 235/441 |
| 5,912,446 A | * | 6/1999 | Wong et al. ................. | 235/449 |
| 5,984,184 A | * | 11/1999 | Kojima ........................ | 235/441 |
| 6,149,064 A | * | 11/2000 | Yamaoka et al. ............ | 235/479 |

* cited by examiner

Primary Examiner—Karl D. Frech
Assistant Examiner—Uyen-Chau N. Le
(74) Attorney, Agent, or Firm—Black Rome, LLP

(57) ABSTRACT

A smart card contacting apparatus comprising: a frame in which contact elements are mounted, a locking element mounted on the frame and adapted to lock a smart card directly or indirectly in a reading position on the frame in which the contact elements contact smart card contacts of the inserted smart card, and a mechanical an unlocking elements provided on the frame and adapted to unlock the locking means when the smart card is moved out of the reading position.

14 Claims, 8 Drawing Sheets

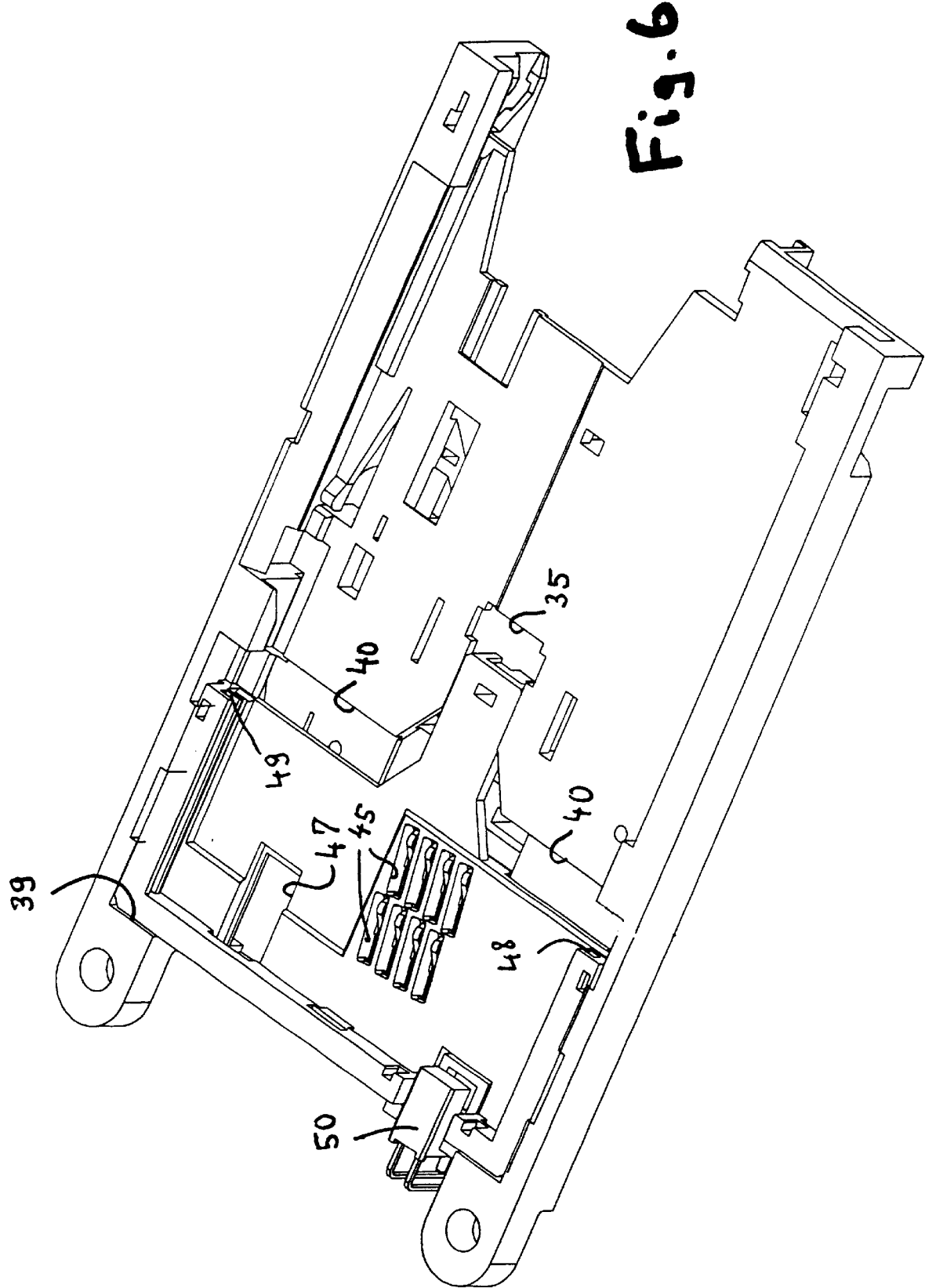

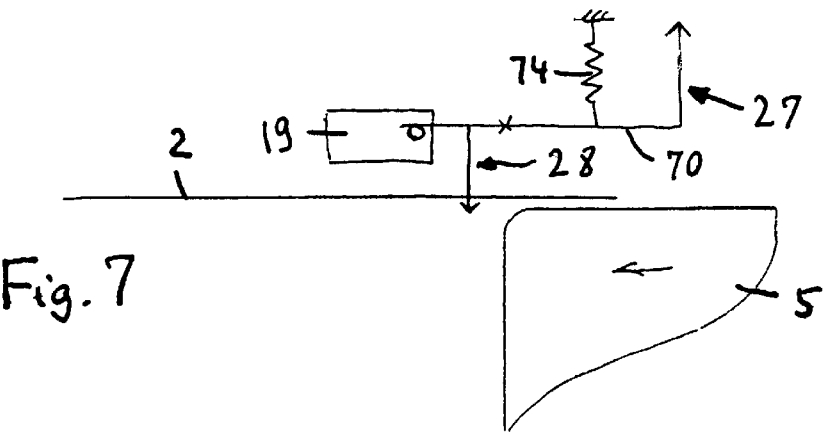
Fig. 7
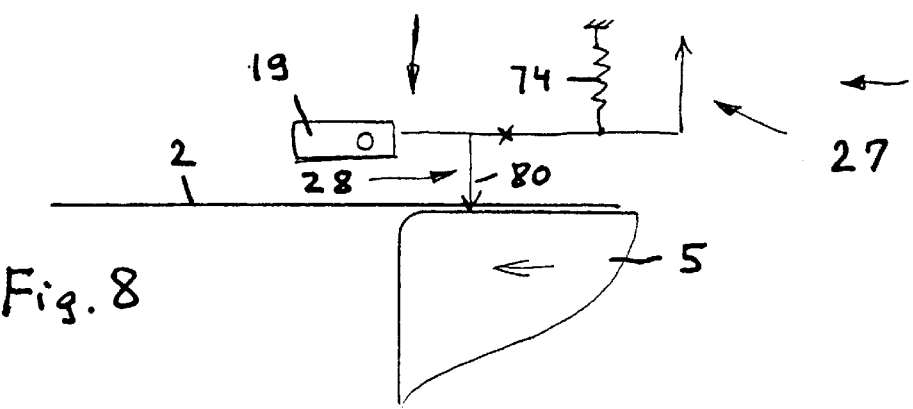
Fig. 8
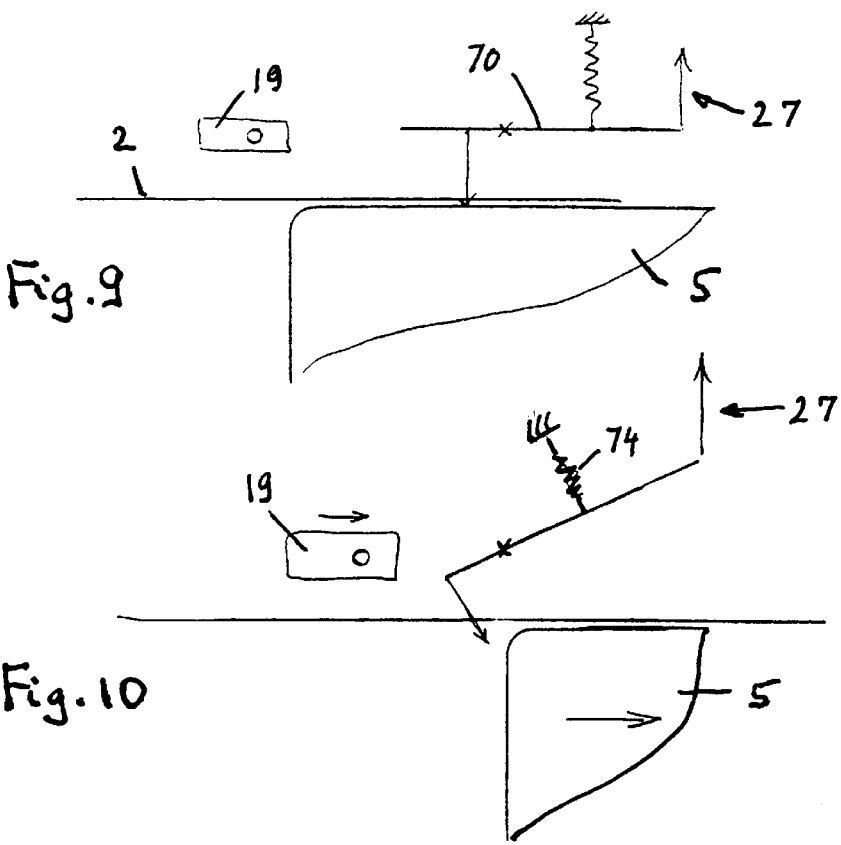
Fig. 9
Fig. 10

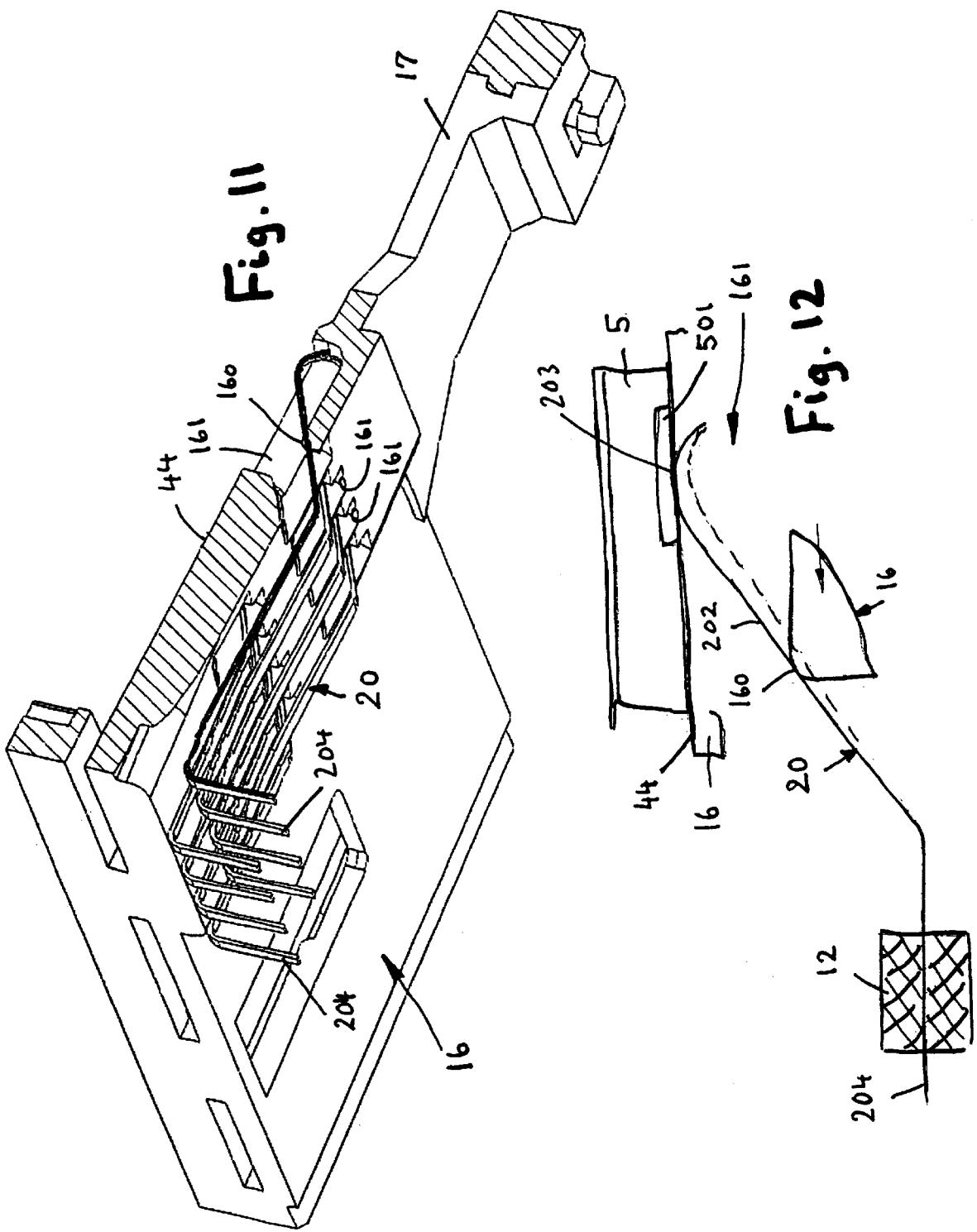

CONTACTING APPARATUS FOR A SMART CARD

BACKGROUND OF THE INVENTION

1. Field of the Invention

The present invention relates to a contacting apparatus for a smart card, also called a chip-card reader or a smart-card reader. Said chip-card reader serves the purpose to provide for a contact engagement or a contact connection to the card contacts which are provided on said chip card.

2. Description of the Related Art

Different designs of chip-card readers are already known. For some chip-card readers the chip-card is inserted manually into a reading position, i.e. a position where the contact elements of the chip-card reader are in contact with the card contacts so that information stored in the chip-card can be "read". For the removal of the chip card from the reader the user pushes against the end of the chip card projecting out of the reader, thus initiating a mechanical means, which ejects the chip card from the reading position. Such a chip-card reader is called a push/push-reader, where the card is pushed into the reading position and is removed from the reading position again by pushing against the projecting end of said card.

For other chip-card readers it is necessary to insert the card manually and to remove the card again manually by pulling it out of the reading position. Occasionally, a movable carriage is provided for the guidance of the chip card.

Chip-card readers typically comprise a slot through which the chip card is inserted into the chip-card reader so as to come into contact with the contact elements of the chip-card reader which are typically mounted in a contact support provided by said chip-card reader. In case no chip card is inserted into the chip-card reader it occasionally happens that people try to insert foreign matter for instance knifes into the insert slot of the chip-card reader. This can lead to damage of the components of the reader, for instance the contact elements.

Chip-card readers are known which will pivot the contact support out of the area of the insert slot in case no chip-card is inserted into the reader. This pivotal movement is provided by use of a carriage. It is also known to cover the contact support so as to avoid its damage.

Further, so called push-matic readers are know. With such a reader the chip-card is manually pushed into the reading position and after "reading" the card it is automatically moved out of the reading position so as to generally project to a larger extent out of the insert slot of the chip-card reader so as to allow its removal.

While the chip-card is in the reading position, it is generally locked. A de-locking operation occurs by an electric de-locking apparatus for instance after the reading operation has been concluded. This electric de-locking apparatus commonly uses an electro magnet which operates a locking lever to release the chip card if the chip card should be released from the reading position.

If the electrical power source fails a problem occurs with the known chip-card readers, in particular with the push-matic readers in so far, as the electrical de-locking apparatus can typically be actuated once more based upon an electrical charge stored in an electrical condenser. However, the energy stored in said condenser is not likely to be sufficient for a plurality of de-locking operations.

It is an object of the present invention to allow the removal of a chip card from a chip-card reader, in particular from a push-matic reader even if the power supply has failed and even if a condenser or capacitor typically provided in such a chip-card reader has been drained.

It is another object of the present invention to provide for the continued operability of the chip-card reader, i.e. it should be possible, even though the electric power has failed, to insert cards into the chip-card reader into the reading position and to remove said cards from the reading position.

A further object of the present invention is to provide a chip-card reader such that during the de-locking operation the contact elements (reading contact elements) of the chip-card reader are moved into an insert position, were damaging of the reading contacts by vandals is not possible.

In accordance with the invention a chip-card reader is provided such that when the card is removed or pulled out of the chip-card reader a de-locking apparatus for instance in the form of a de-locking lever is actuated and the de-locking lever releases the locking mechanism for the chip-card. The arrangement is such that for said mechanical de-locking operation in case of lack of electrical energy (default of the power supply) no damage of the reading contacts occurs, if a chip card is inserted again.

In accordance with the present invention the chip-card reader comprises contact elements which are moved by force. The chip-card reader comprises a carriage for the card. Said carriage comprises slots adapted to receive the contact elements in a card receiving portion. Said slots form abutment surfaces which will come into engagement with the preferably angled arms of said contact elements so as to move those from a protected rest position into contact engagement with the chip-card contacts. This occurs when said carriage is moved from a start position into a carriage reading position corresponding to the reading position of the card. When the carriage moves back to the start position, in particular due to a spring acting on said carriage, then said abutment surfaces liberates the contact elements for a movement in their rest position, were the contact cusps of the contact elements no longer project into the insert slot of the chip-card reader.

Generally, the present invention is directed to a chip-card reader comprising:

a card receiver portion in which contact elements (reading contacts) are mounted for contacting the chip-card contacts of a chip card located in a reading position of the chip-card reader;

a locking apparatus adapted to lock the chip card in the reading position of the chip card;

an electrical unlocking apparatus adapted to unlock the locking mechanism and releasing the chip card; and an additional mechanical unlocking apparatus which unlocks the locking apparatus when the card is manually pulled out of the reading position such that the card is completely free for being removed and wherein further another insertion and reading of the card is possible.

In accordance with another aspect of the present invention a chip-card reader is provided which comprises:

a card receiver portion with contact elements mounted therein, said contact elements being adapted to contact the chip-card contacts of a chip card located in a reading position;

a carriage reciprocally mounted in said card receiving portion, said carriage being biased against the direction of card insertion into a start position; said carriage being moved into a reading position corresponding to the reading position of the card when inserting said card against said bias;

an apparatus adapted to lock said carriage directly or indirectly in its reading position and thus also locks the card in its reading position;

an electric unlocking apparatus which unlocks the locking apparatus when an electrical unlocking signal is received, such that the card is preferably moved out of its reading position; and a mechanical unlocking apparatus which is actuated in particular when the electrical power fails by pulling the card manually out of the reading position, said unlock apparatus providing the unlocking such that the carriage can return to its start position and the continued use of the reader by manual operation is possible.

SUMMARY OF IMPORTANT FEATURES OF THE INVENTION

Starting from a chip-card reader having an electrical unlocking apparatus using a capacitor and a release magnet, it is desired to provide for the unlocking of the chip-card reader even if the power supply fails. Typically, the unlocking operation by means of a capacitor can be performed only once, i.e. if the power failure lasts for a long time, then if a chip-card is again inserted into the chip-card reader a locking operation occurs, but because the capacitor is "empty" no unlocking can be effected. It is, however, desired that the chip card should always be removable even if the power supply fails for a long time.

So as to achieve the above object the chip-card reader is provided with an unlocking lever passed which the card moves when being inserted. The chip card further moves a locking element or a locking slide, and the chip card as well as the locking element move a carriage or card guide means. Said carriage is, at the same time, a control element for the contact elements, i.e. the reading contact elements and releases said contact elements for contacting with the card contacts. In the reading position a locking element or a locking lever locks the locking element and thus the entire mechanical system. If a power failure occurs, then the chip card can be pulled out of the chip-card reader. The chip-card reader remains for the time being in its locked position until the card releases the unlocking lever which in turn releases the locking lever, where upon the locking slide moves together with the carriage into the start position. This operation can be repeated a number of times, inasmuch as, if a power failure occurs, for each insertion a locking operation is carried out, but there is also an unlocking operation carried out when the card is pulled out of the chip-card reader.

Other aspects and advantages of the present invention can be seen upon review of the figures, the detailed description and the claims which follow.

BRIEF DESCRIPTION OF THE DRAWINGS

FIGS. 1 and 3 disclose perspective views of embodiment of a contacting apparatus for a chip or smart card 5, also called a chip-card reader 1 of the invention. The chip-card or smart card reader 1 comprises a card receiving member or means 2, also called a frame 2. A card insert part 3 is fixedly mounted to the frame or card receiving member 2 and comprises an insert slot 4 for the chip or smart card 5. The insert slot 4 extends through the insert part 3 but can be thought to extend all along into the chip-card reader 1 for providing a space adapted to receive the chip card 5 when it is inserted into and in the chip-card reader 1.

Figure 1:
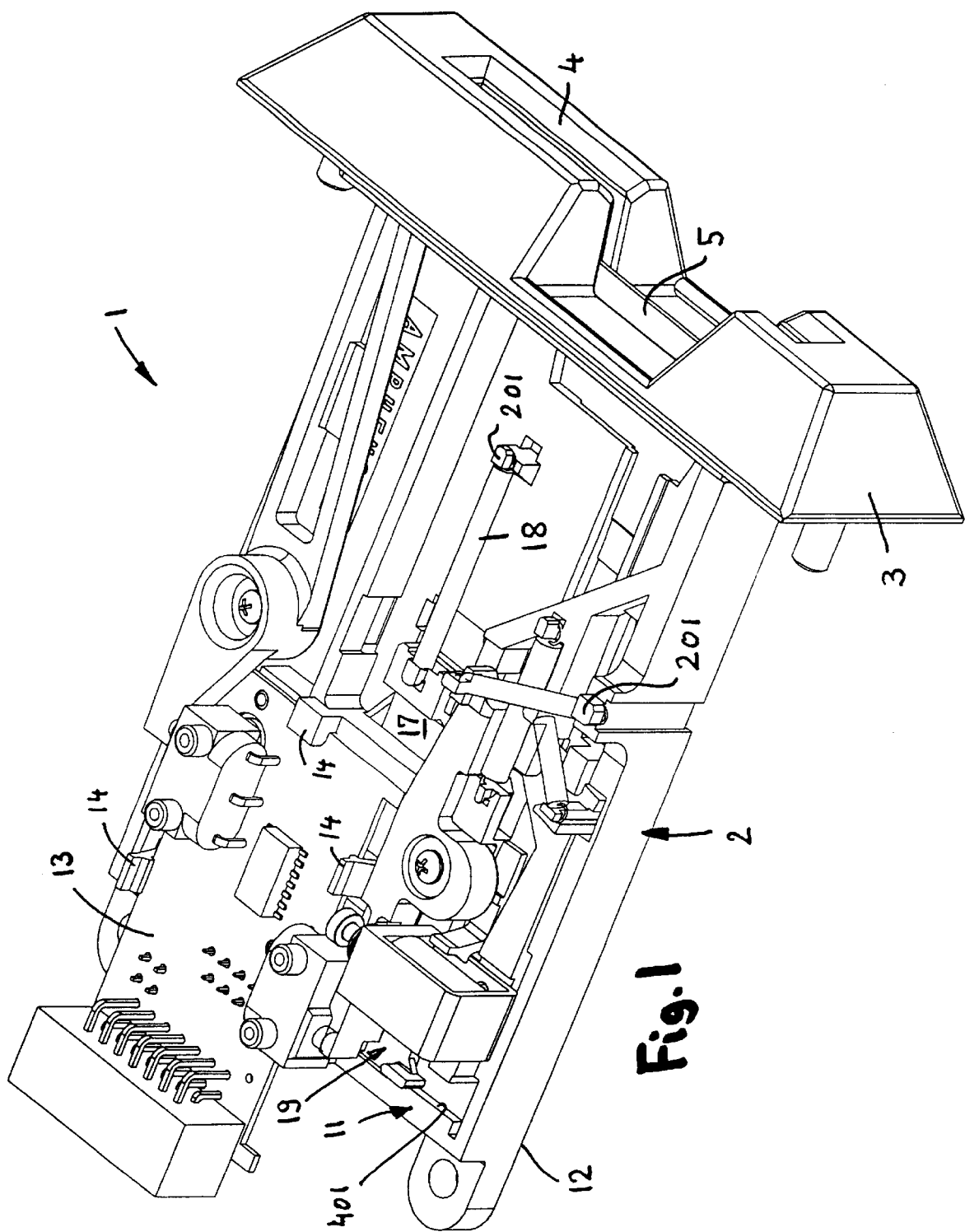
FIG. 1 is a perspective top view of a chip-card reader according to the invention.
Figure 3:
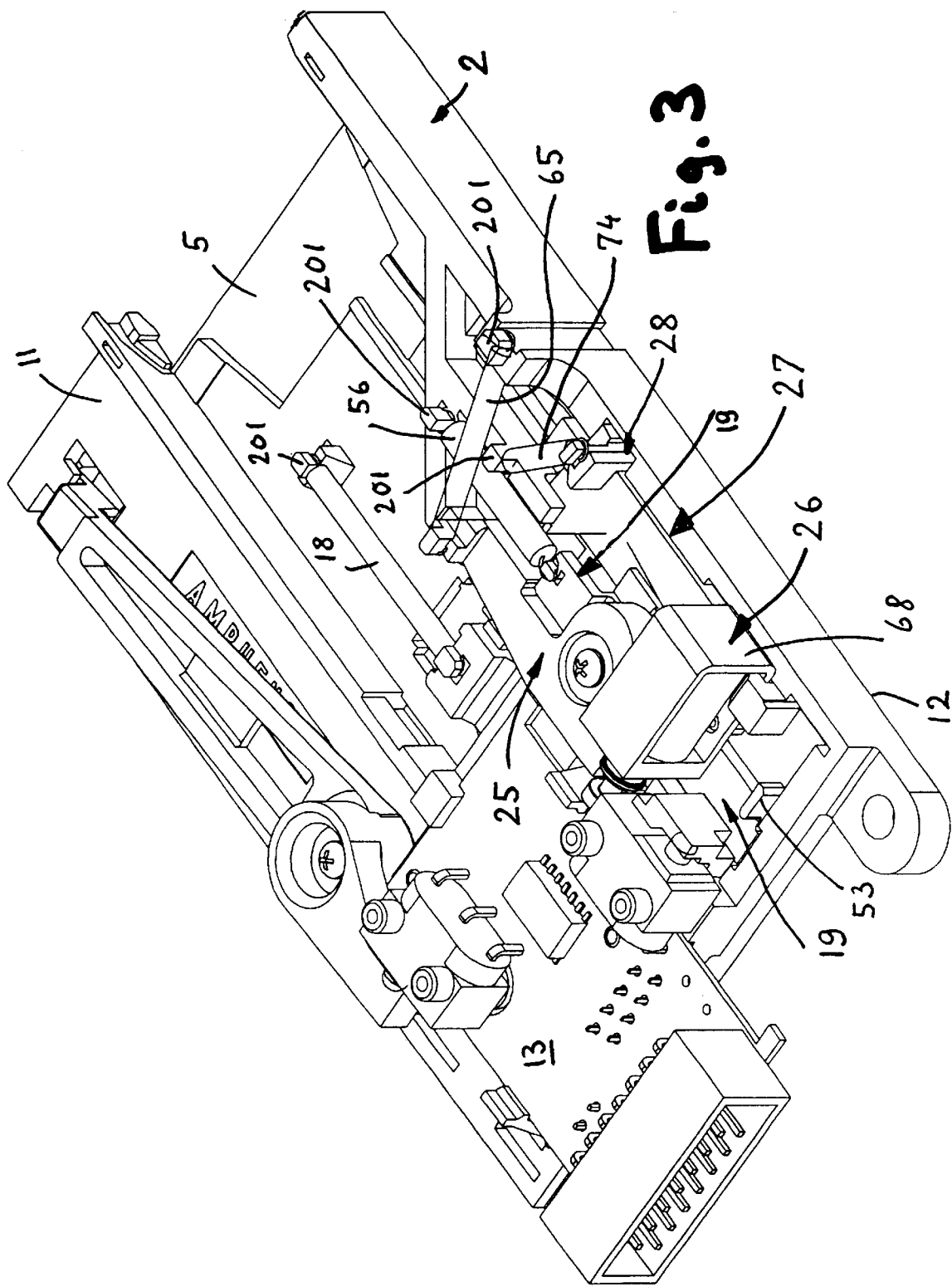
FIG. 3 is another perspective top view of the chip-card reader of FIG. 1 with a card insert part being deleted.

In the representations of FIGS. 1 and 3 the chip card 5 is located in its so-called reading position. As can be seen in FIG. 1, the chip card 5 has almost completely disappeared in the insert slot 4. However, at the location of the reference numeral 5 of FIG. 1, the chip card 5 is still accessible, so as the allow the manual removal of the chip card 5.

According to FIG. 1 a printed circuit board 13 is mounted on an upper surface 11 of the frame 2. The printed circuit board 13 carries the electronic components for the operation of the chip-card reader 1. In the embodiment shown in FIG. 1 the circuit board 13 is mounted by means of clamping hooks 14 which are integrally formed together with the frame 2, the bottom surface of which is referred to by reference numeral 12.

Figure 2:
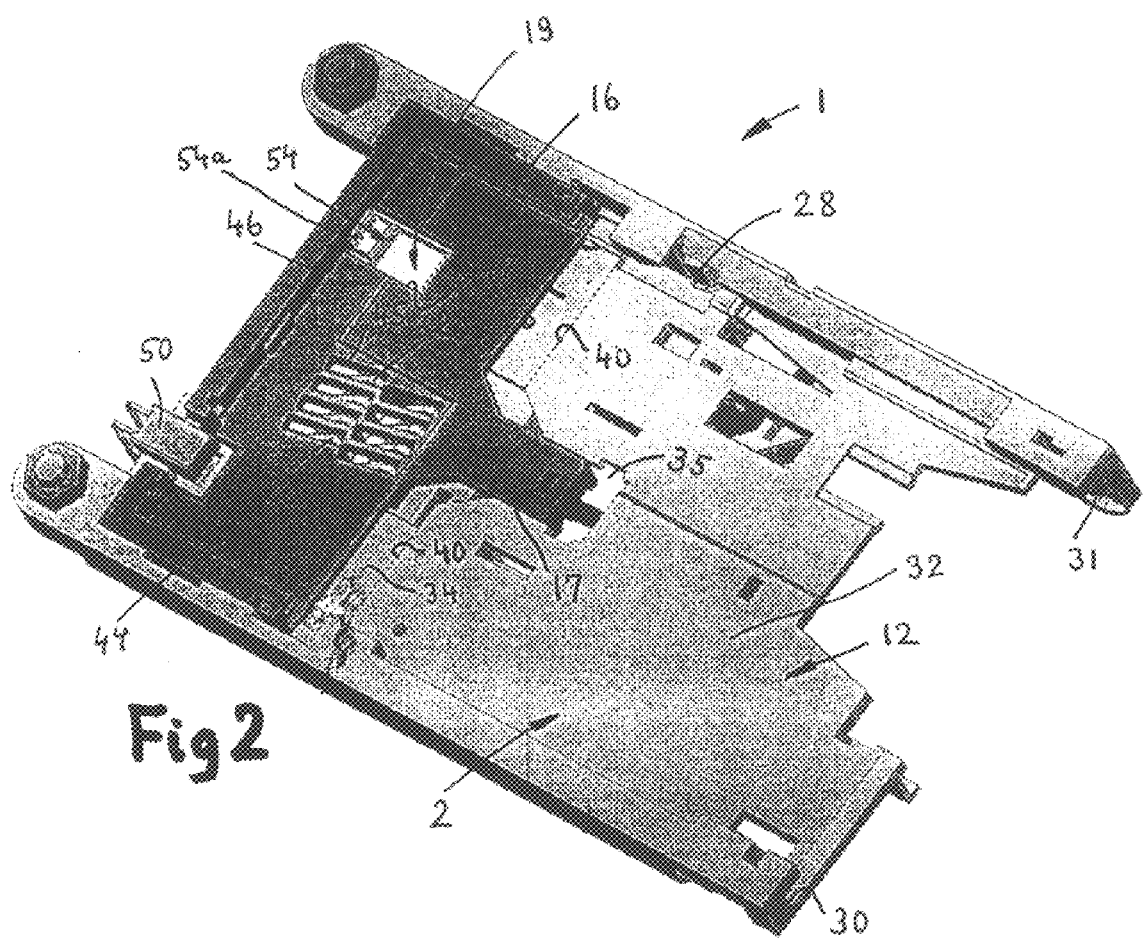
FIG. 2 is a perspective top view onto the bottom side of the chip-card reader of FIG. 1.

As can be seen in the drawing and in particular in FIG. 1, the chip card 5 is inserted with its forward portion into a card guide means (carriage) 16 of which FIG. 1 shows only a projection 17 and also a biasing spring 18 for biasing the carriage 16 into a short position (not shown). The term "forward" means that portion of the chip card (i.e. in FIG. 1 the left one) which extends into the direction of insertion of the chip card. FIG. 2 as well as FIG. 11 discloses the carriage 16 in some more detail.

FIGS. 1 and 2 further disclose a locking slide means (coupling element) 19 which will be discussed in detail below.

FIG. 3 provides a slightly different perspective view of the upper surface 11 of the frame 2. A locking apparatus (locking means) 25 is provided which locks chip card 5 and carriage 16 in the respective reading positions, i.e. the reading position of the chip card 5 and the reading position of the carriage 16. An electrical unlocking means (unlocking apparatus) 26 serves the purpose to unlock the locking means 25 when the electric unlocking means 26 receives a respective unlocking signal. The locking means 25 is then transferred into an unlocking position.

In accordance with the invention, in addition to the electrical unlocking means 26 a mechanical unlocking means 27 is preferably provided. The mechanical unlocking means 27 is adpated to unlock—independently of the electrical unlocking means 26—the locking means 25 when a respective unlocking signal is received. This signal is supplied by a card sensing means (card sensing apparatus) 28 and it is preferably a mechanical signal (i.e. a motion signal).

Figure 4:
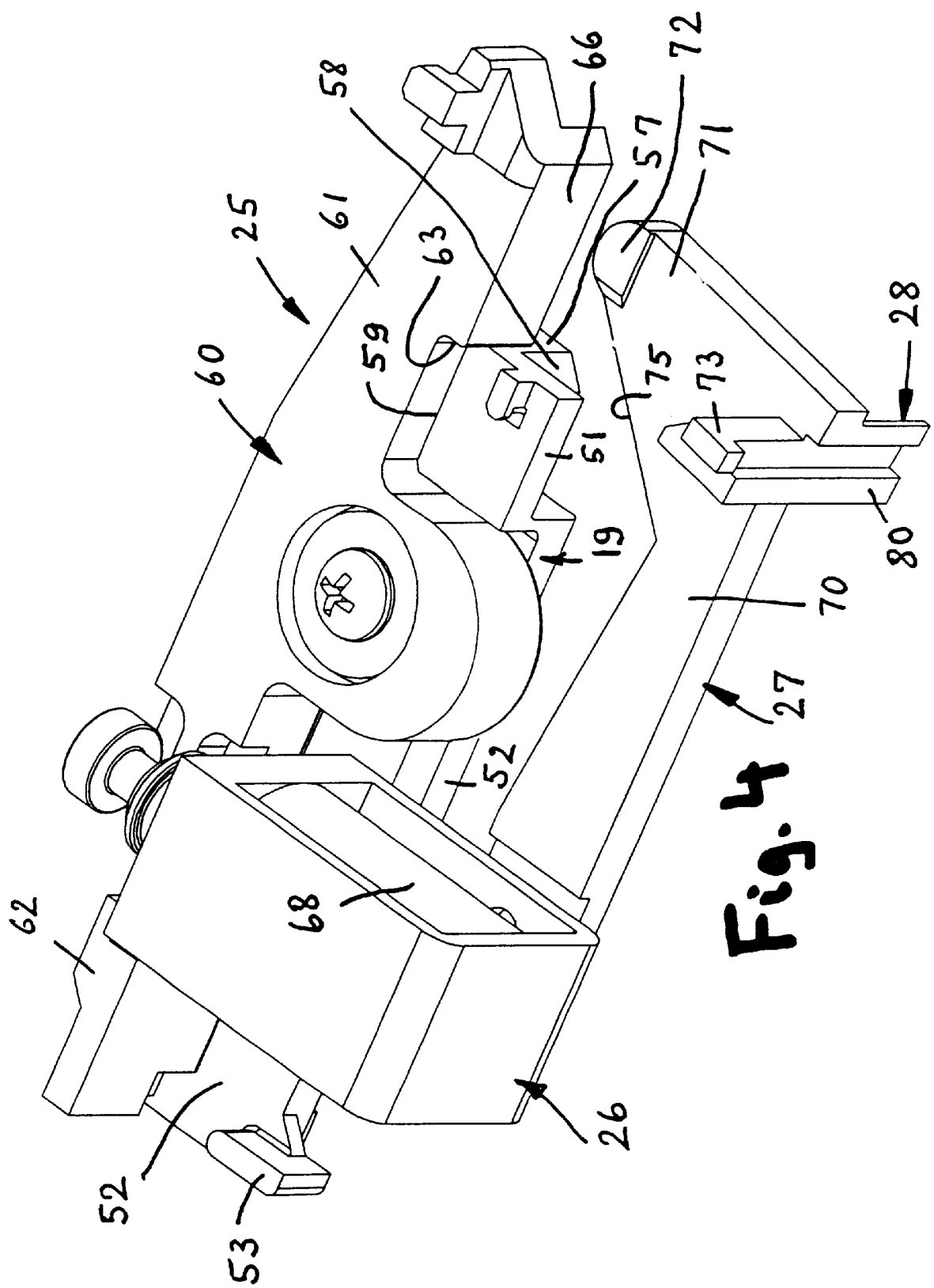
FIG. 4 is a detail of components of the locking and unlocking apparatus of FIG. 1.

The card sensing means 28 is preferably designed such that it supplies the mechanical signal when the chip card 5 is pulled out of its reading position and in particular also out of the carriage 16. In the embodiment shown the card sensing means 28 is formed integrally with a lever 70 (FIG. 4) yet to be described of the mechanical unlocking means 27.

Figure 5:
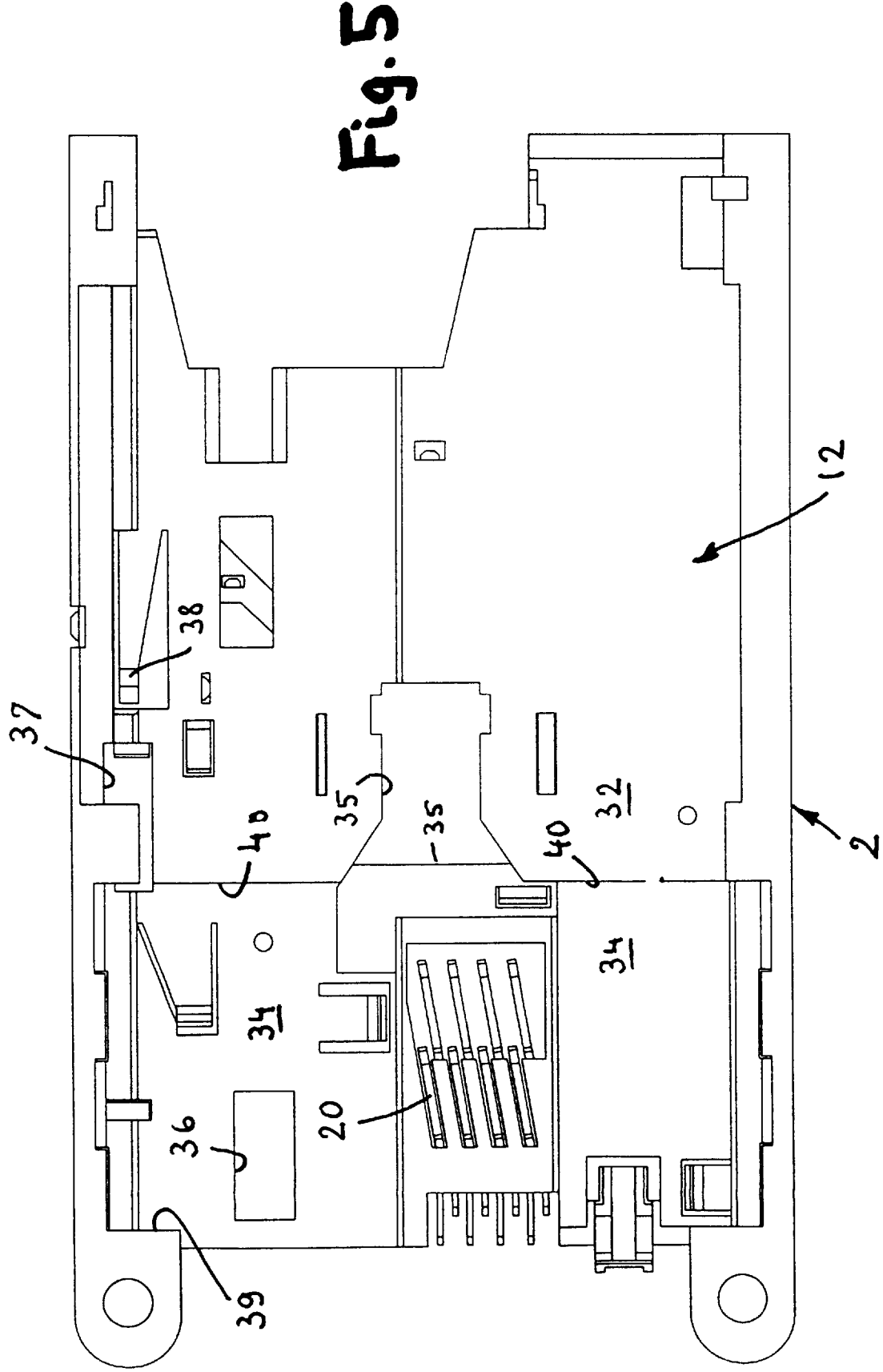
FIG. 5 is a top plan view similar to FIG. 2 with a carriage being deleted.
Figure 1:
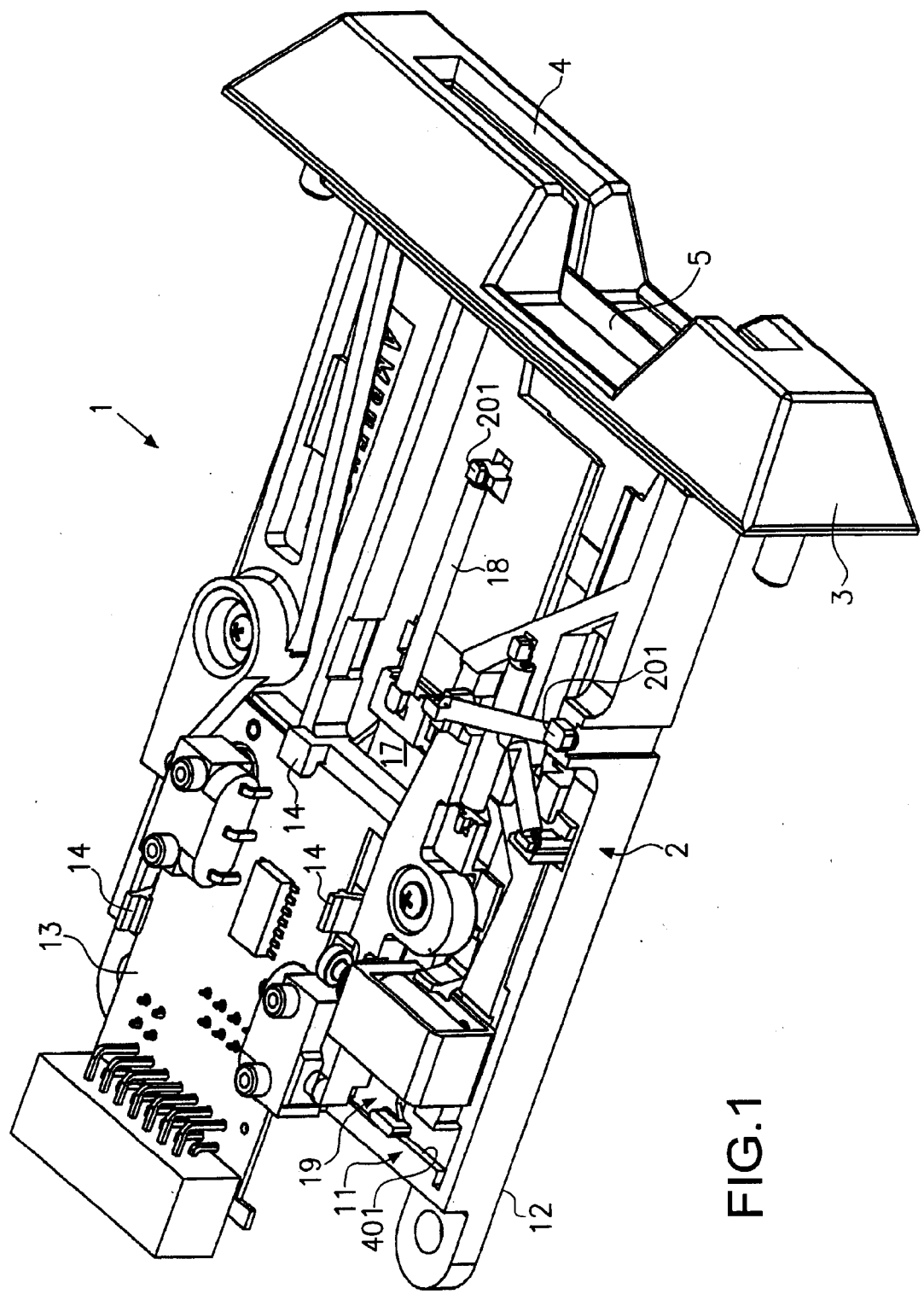
Figure 2:
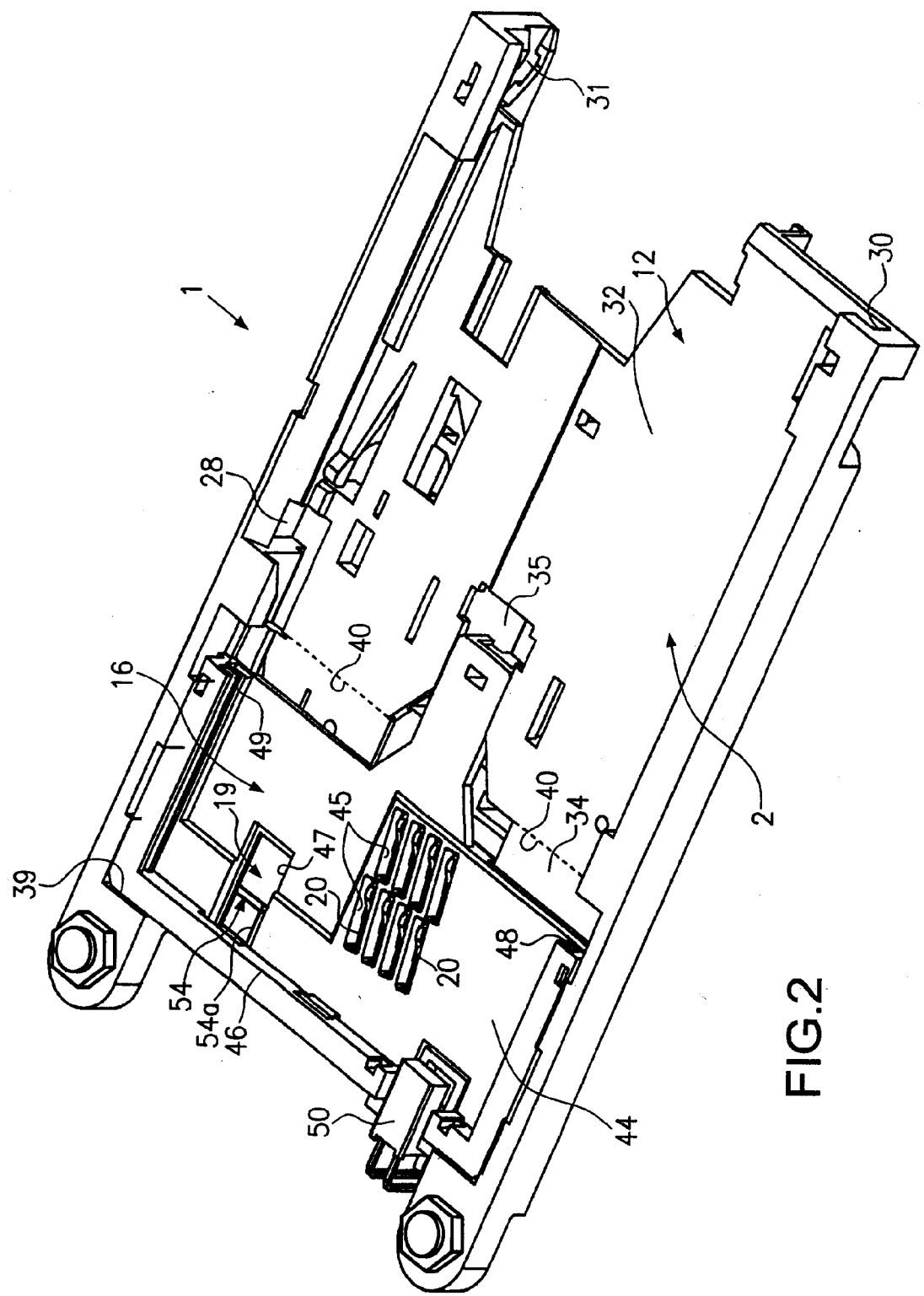
Figure 3:
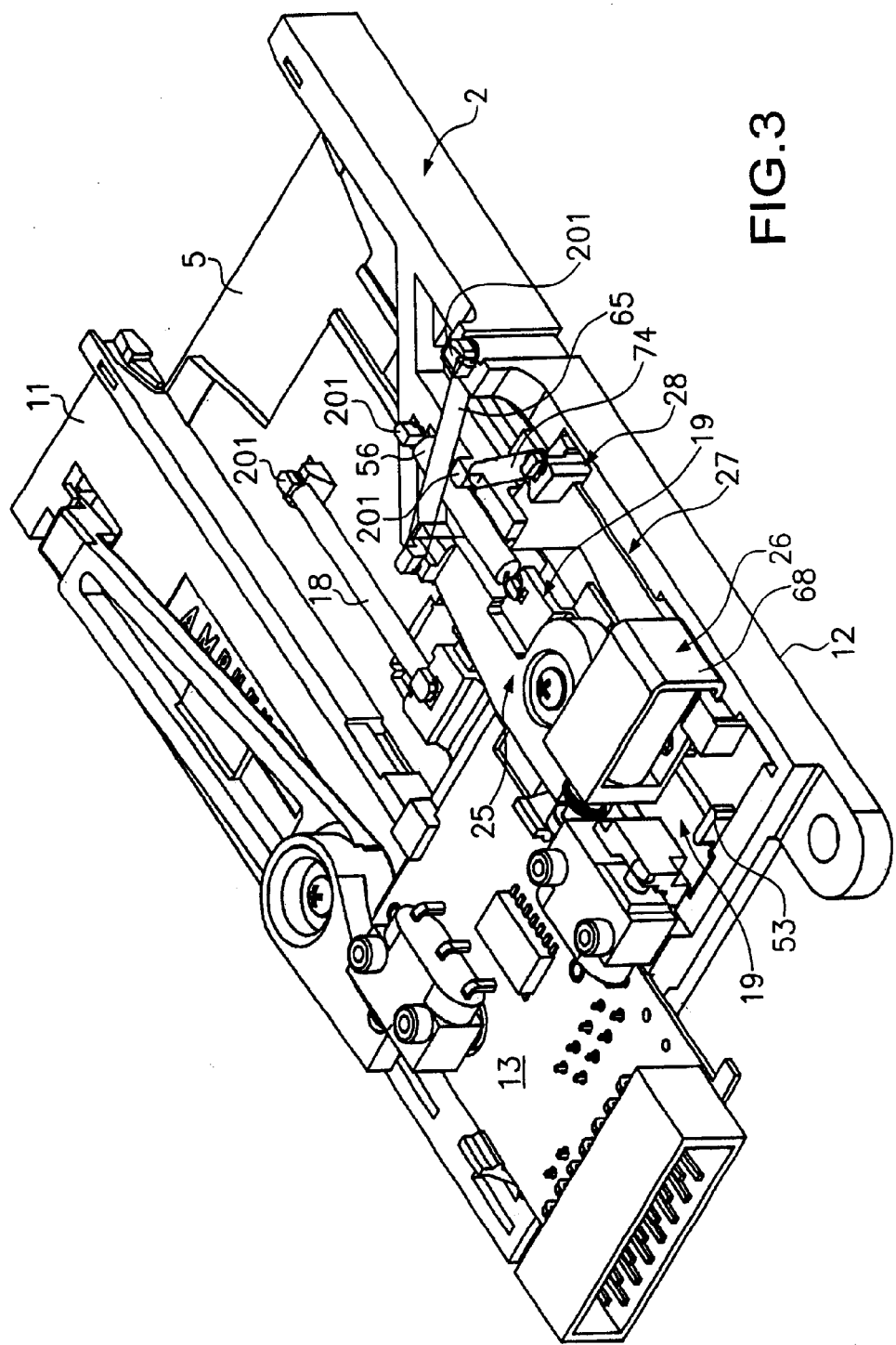
Figure 4:
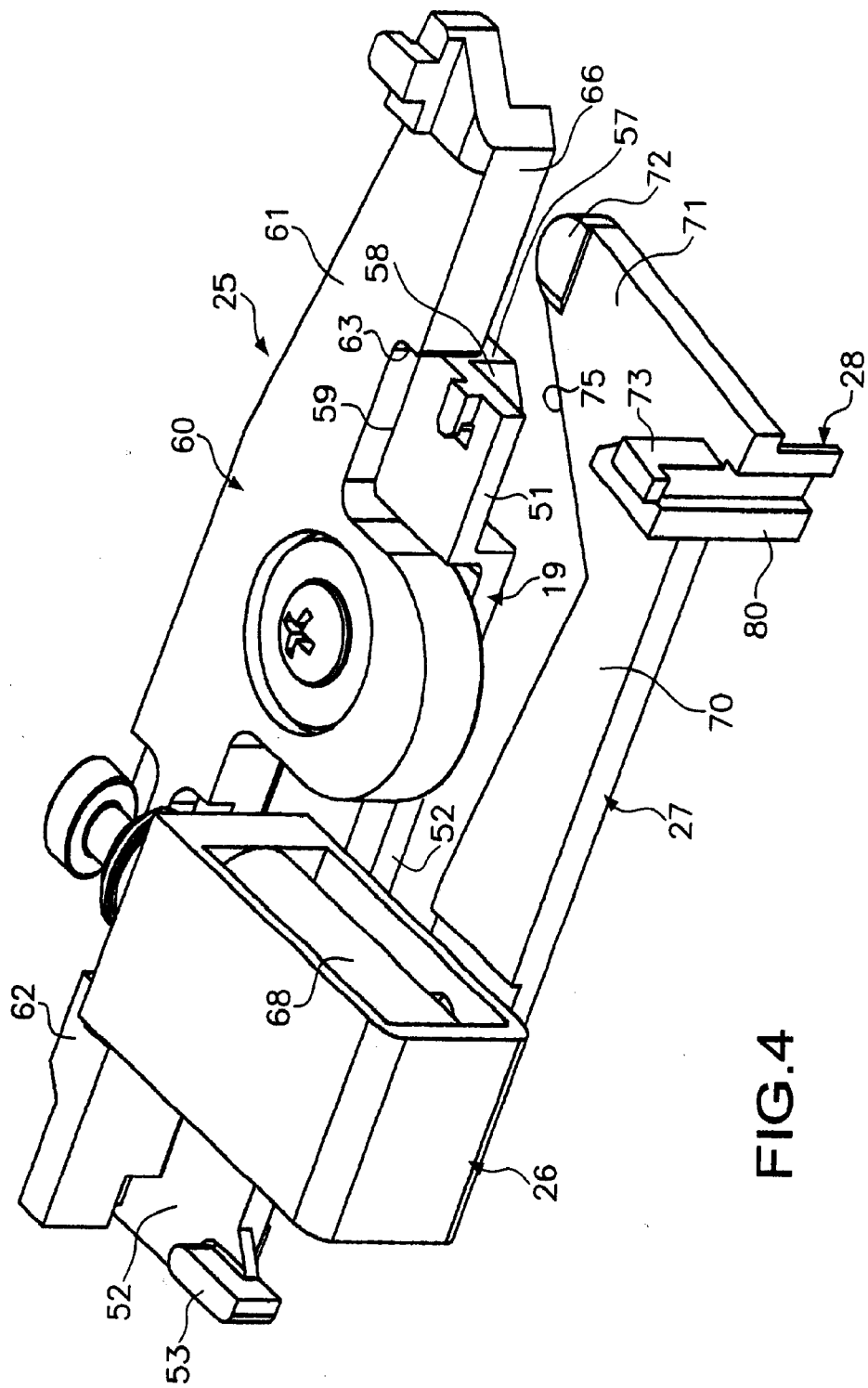
Figure 5:
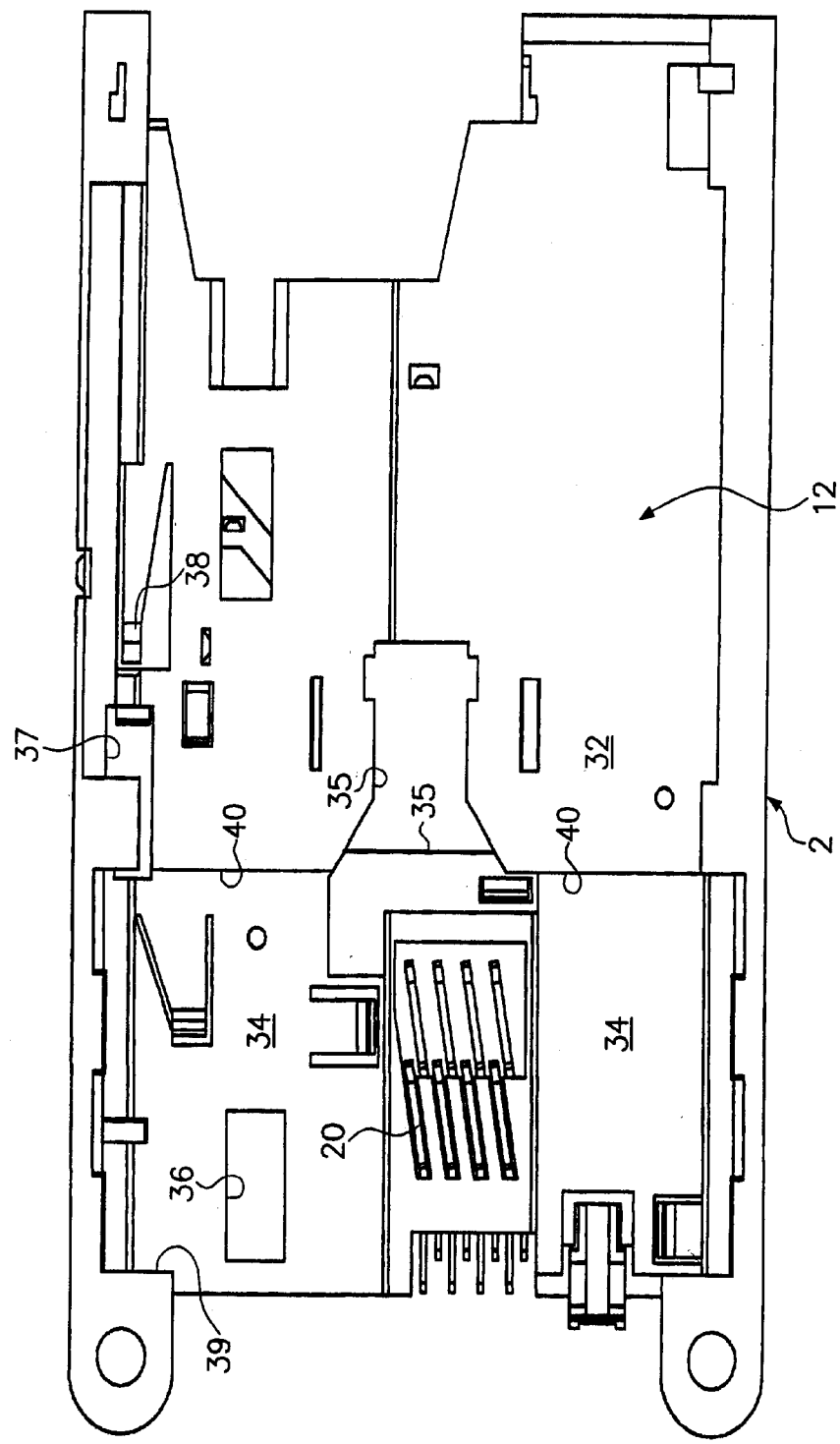
Figure 6:
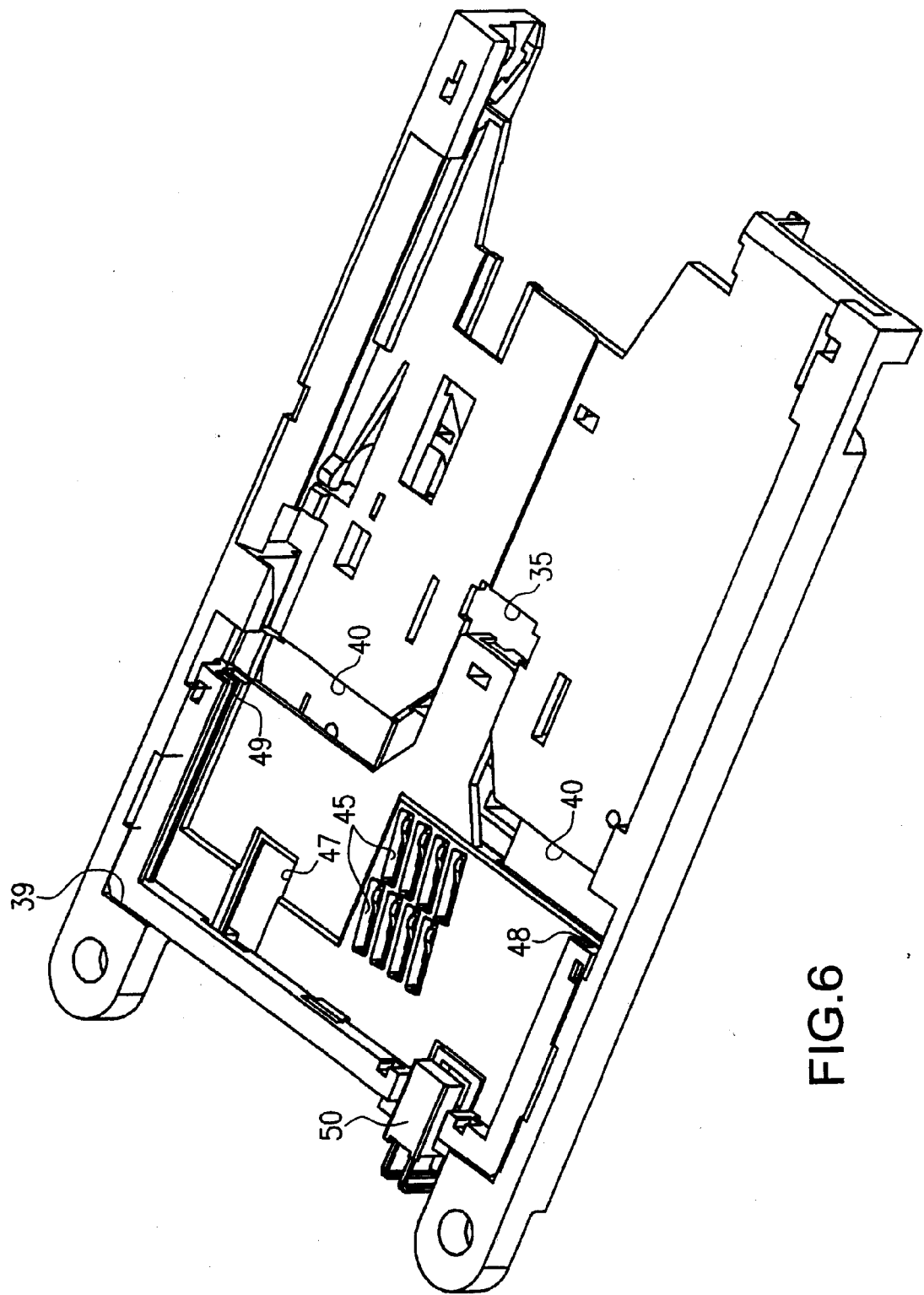
FIG. 6 is a view similar to FIG. 2 but with a coupling element being deleted.
Figure 7:
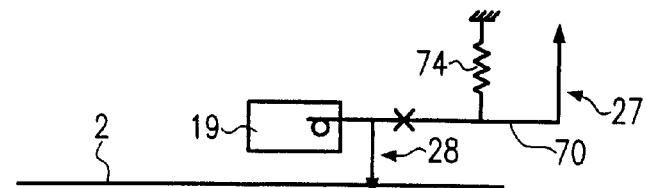
FIGS. 7 through 10 are schematic sketches assisting in the explanation of the contacting apparatus of the invention as shown in FIG. 1.
Figure 8:
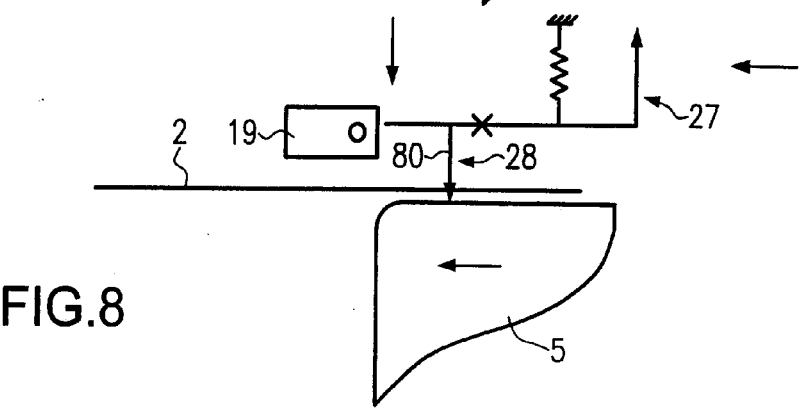
Figure 9:
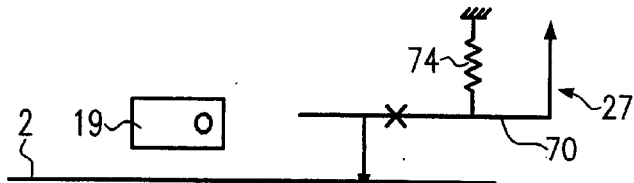
Figure 10:
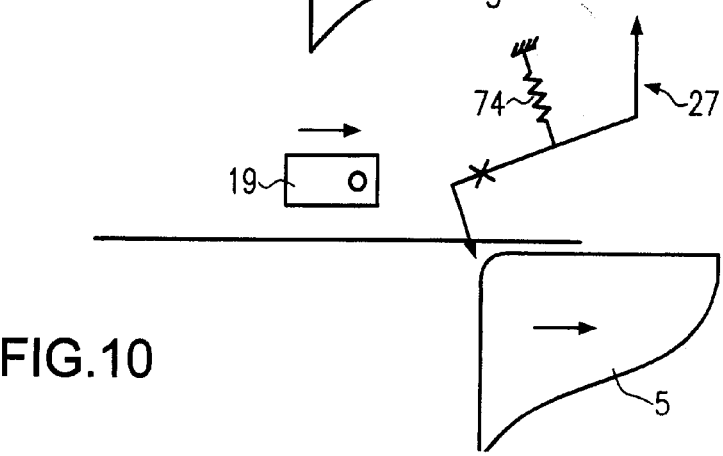

The frame 2:

FIG. 1 shows the frame 2 from above while FIGS. 2, 5 and 6 show the lower surface 12 of the frame 2. The frame is provided at its lower surface 12 (see FIG. 2) with lateral frame portions in which lateral card guide slots 30, 31 are formed in which a chip-card 5 is received and guided when it is pushed into the chip-card reader 1. Between said lateral frame portions of the frame 2 extends a substantially plane card support surface 32 up to a downward step (FIG. 2) were—see FIG. 5—a substantially planar support surface 34 for the carriage 16 starts. The support surface 34 is offset in downward direction with respect to the support surface 32. The step forms an abutment surface 40, for the right (FIG. 2) end of the carriage 16.

As seen in FIGS. 2 and 5, adjacent to the support surface 34 is an opening 35 substantially centrally located. The opening 35 is adapted to receive the projection 17 of the carriage 16, such, that a support surface 44 (FIG. 2) formed by the carriage 16 is located substantially in the same plane with the card support surface 32. Further, a substantially rectangular opening 36 (FIG. 5) is provided in the frame 2 in the area of the guide surface 34, so as to allow that a portion of the coupling element 19 can extend through said opening 36. Another opening 37 (FIG. 5) is provided adjacent to a lateral edge of the frame 2 so as to allow the card sensing means 28 (FIG. 2) to extend therethrough.

Adjacent to the opening 37 (FIG. 5) the frame 2 forms an arm 38 adapted to apply holding a force to a chip card inserted into the chip-card reader 1. Moreover, the frame 2 forms an abutment surface 39 (FIG. 5) for the carriage 16 defining the reading position of the carriage as well as of the chip card. The step which had been mentioned forms as already mentioned, the abutment surface 40 for the carriage 16 defining its start position.

Figure 11:
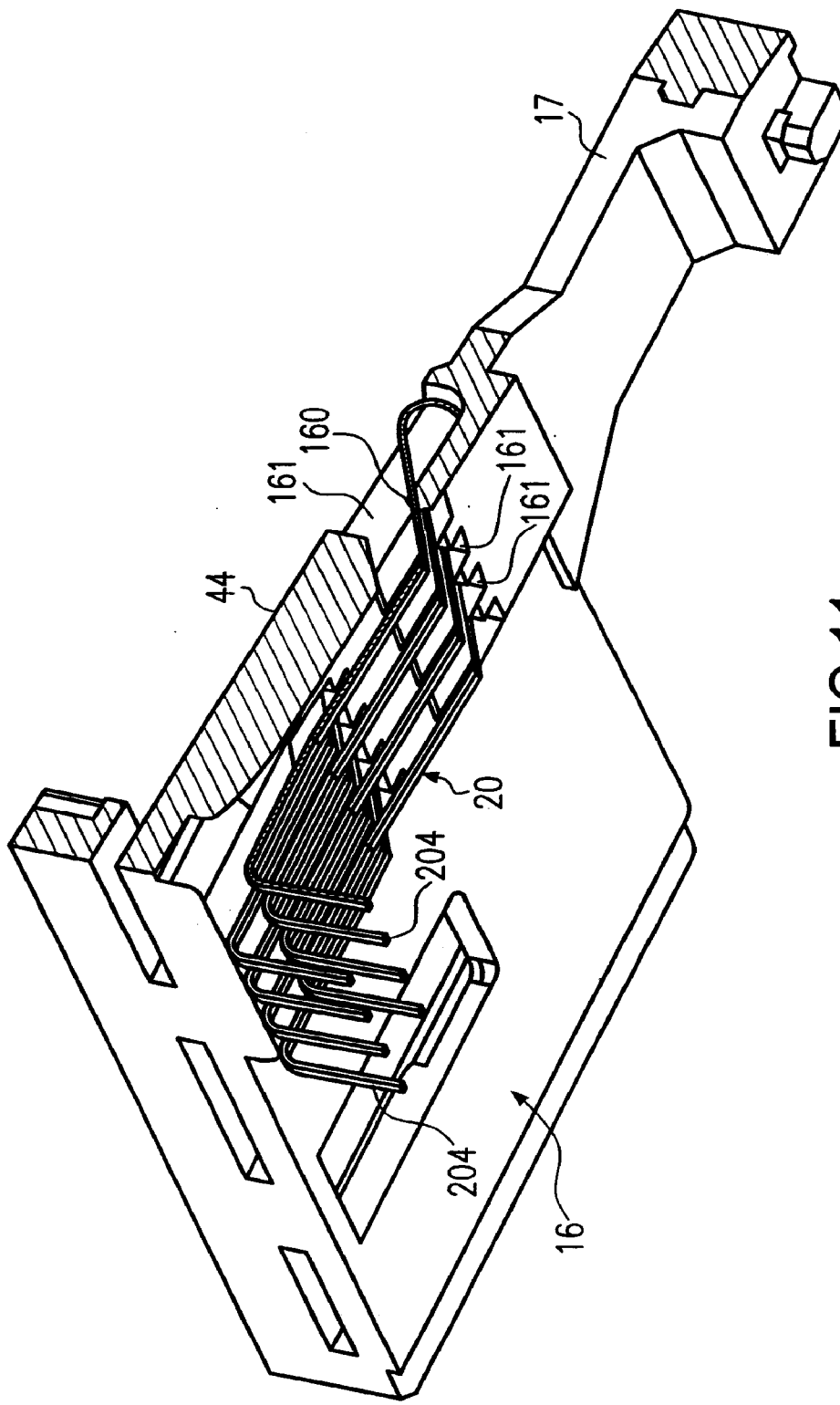
FIG. 11 is a perspective partially cut schematic view of a carriage together with a contact elements shown in the reading position, i.e. a position contacting the card contacts of the chip-card.

The carriage 16:

Referring to FIGS. 2, 6 and 11 in particular, the carriage forms said card support surface 44 as well as a plurality of recesses or slots 45 which are preferably inclined with respect to the longitudinal axis of the carriage 16. Each one slot 45 is assigned to each one of a plurality of contact elements 20. It is to be remembered that the contact elements 20 are fixedly mounted in the frame 2 (see FIG. 5) but extend with their ends having contact cusps 203 (see FIG. 12) into the slots 45 of the carriage 16. The carriage 16 is guided for its longitudinal movement by the lateral walls of the frame 2. The carriage 16 forms a card abutment surface 46 (see FIG. 2) as well as a recess or opening 47 in the area of the recess or opening 36 of the frame 2 such that a card abutment portion 54 (FIG. 2) of the coupling element 19 can extend therethrough. Guide slots 48 and 49 (see FIG. 6) are formed in the lateral edges of the carriage 16. The guide slots 48 are aligned with the guide slots 30, 31 of the frame 2.

Figure 12:
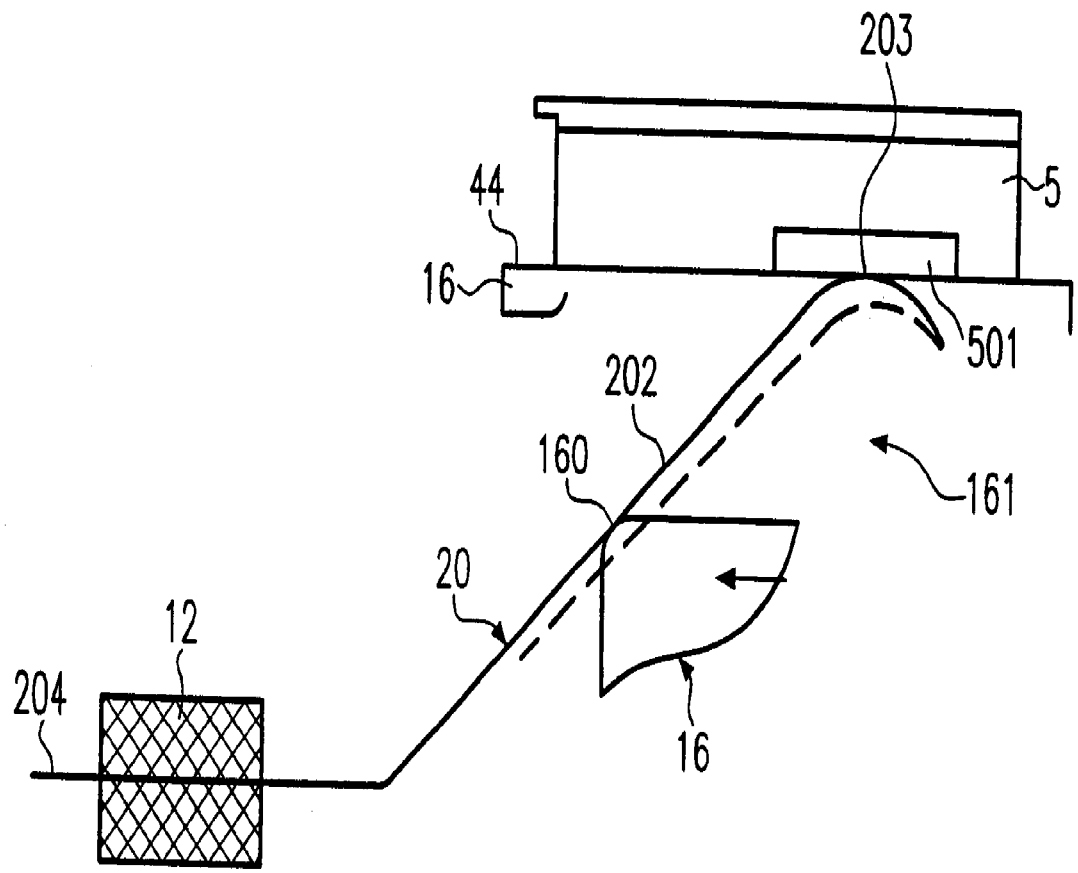
FIG. 12 shows schematically a detail of FIG. 11.

FIGS. 11 and 12 show the carriage 16 in its reading position, into which it is pushed by the manual insertion of a chip card 5 abutting against an effective abutment surface 54a of card abutment portion 54 and the abutment surface 46. The reading position of the carriage 16 corresponds to the reading position of a chip card. As mentioned, the contact elements 20 are shown in FIG. 11 without the frame 2 in which they are mounted. The contact elements 20 extend preferably in substance in two parallel layers of each four contact elements. The contact elements 20 comprise (see FIG. 12) termination or connecting ends 204 at one end, than an inclined portion 202 followed by a contacting portion having said contact cusps 203. The termination ends 204 extend or project out of the chip-card reader for connection with a customer circuit board not shown on which the chip-card reader 1 will be used. edges 160 of the carriage 16 come into engagement with approximately the center of the inclined portions 202 of the contact elements 20. Said edges 160, i.e. one edge 160 for each contact element 20, are formed by slots 161 in the carriage 16. Thus, when the carriage 16 is moved into the reading position (shown in the Figures) then the edges 160 engaging the inclined portions 202 move the contact elements 20 from a rest position into a contacting or reading position. In the contacting or reading position the contact cusps 203 extend beyond the support or abutment surface 44 of the chip card and come thus in contact with chip card contacts 501 (FIG. 12).

The coupling element 19:

The coupling element 19 comprises said card abutment portion 54 which extends through said openings 36 and 47 and is of a stepped design as shown in FIG. 2. The card abutment portion 54 is adapted to be located in a recess of the card abutment surface 46 of the carriage 16 (see FIG. 2) such that the effective abutment surface 54a of the card abutment portion 54 provides for an even abutment surface at the card abutment surface 46 for the forward edge of a chip card 5 which is thus in abutment with said abutment surface 46 as well as the effective abutment surface 54a of the card abutment potion 54.

As mentioned, all Figures show the carriage 16 moved into its reading position due to the insertion of a chip card 5 against the bias of the spring 18. Also the coupling element 19 is in its reading position, i.e. a position corresponding to the reading position of the coupling element 19. Indeed, in the position shown, the coupling element 19 has been moved by the chip card 5 against the force of a coupling element spring 56 (extending between a right (FIG. 3) end of the coupling element 19 and a frame anchoring portion 201) with the consequence, that the card abutment portion 54 is placed in the recess of the card abutment surface 46 of the carriage 16. The carriage 16, in turn, is in abutment with the abutment surface 39 of the frame 2.

The coupling element 19 provides for a coupling between the carriage 16 and the locking means 25 and also between the mechanical unlocking means 27 and the card sensing means 28.

As explained above, the coupling element 19 extends with its card abutment portion 54 to the lower surface 12 of the chip-card reader 1. However, the greater part of the coupling element 19 is located on the upper surface 11. The coupling member 19 is reciprocally mounted on the frame 2 (not shown) by means of an elongated hole for movement in the direction of the longitudinal axis of the chip-card reader 1. The coupling element 19 is biased by said coupling element spring 56 in a direction opposite to the direction of insertion of a card 5 into the chip-card reader 1. Spring 56 is anchored with one end at the frame to said anchoring portion 201. Similar anchoring portions 201 are also provided on the frame 2 for the respective ends of other springs which are used. More specifically, the other end of the spring 56 is connected with an angled portion 51 (FIG. 4) of the coupling element 19. An arm portion 52 of the coupling element 19 extends below the locking means 25 and below the electrical unlocking means 26 (see FIG. 4) and forms at its leftward end in FIG. 4 an abutment portion or member 53 which is adapted to abut at an abutment surface 401 at a leftward (see FIG. 1) portion of the frame 2. The abutment of the abutment member 53 at the abutment surface 401 occurs when the carriage 17 is in its reading position as shown in FIG. 1. The coupling element 19 forms at its right end (see FIG. 4) at its angled portion 51 a locking surface 57 which cooperates with the locking means 25. The right end of the coupling element 19 also forms adjacent to the locking surface 57 an inclined abutment surface 58.

The locking means 25:

The locking means 25 comprises (see FIG. 4) a pivot lever 60 which has two arms and which is pivotally mounted at the frame 2. One of said arms is a locking arm 61 and the other arm is an unlocking arm 62. The pivot lever 60 is biased by means of a spring 65 (FIG. 3) into its locking position as shown in the figures. In the locking position a locking surface or a locking edge 63 (FIG. 4) is in engagement with said locking surface 57 whereby a movement of the coupling element 19 due to the force of spring 56 into its start position is blocked.

The electrical unlocking means 26 comprises first of all a release magnet 68, which, when excited, applies an attracting force to the unlocking arm 62 and thus pivots the pivot lever 60 counter clockwise with the consequence that the locking edge 63 releases the coupling element 19 or its locking surface 57 for movement against the direction for card insertion (i.e. in the direction of contraction of spring 56).

The mechanical unlocking means 27:

The mechanical unlocking means 27 comprises preferably previously mentioned single-armed lever 70 which is pivotally mounted at the frame 2 under the release magnet 68. An angled portion 71 of said lever 70 forms an impact member. At the outer most end of the angled portion 71 is a guide portion 72 formed and adjacent to the guide portion 72 a cam surface 75 is provided which faces towards the coupling element 19. Moreover, lever 70 forms similar to the other spring biased components an anchoring pin 73 for a spring 74. The spring 74 (FIG. 3) extends from said spring anchoring pin 73 to another anchoring portion 201 of the frame, so as to bias the lever 70 with its cam surface 75 towards the abutment surface 58. Under certain operating condition yet to be elluscidated, the cam surface 75 is biased to abut at said abutment surface 58.

Card sensing means 28:

The card sensing means 28 of the invention are used to make sure that in the case of a power failure to operate the electrical unlocking means the chip-card reader is still operative. The card sensing means 28 make sure that when the card is manually removed from the chip-card reader provisions are made by the components of the chip-card reader so as to keep the chip-card reader 1 operative even during power failure. Thus, chip cards can be repeatedly inserted and removed without any problems.

The card sensing means 28 of the invention determines when a chip card 5 is removed from or pulled out of the reading position. The position and location of the card sensing means 28 is such (see FIG. 2) that when the card is about half removed from the chip-card reader 1 said card sensing means 28 is actuated. This actuation causes, in the case of the present embodiment, that instead of the electrical unlocking means 26 the mechanical unlocking means 27 is actuated. Simultaneously the removal of the carriage 16 from its reading position into its start position is effected for the embodiment as shown.

In the disclosed embodiments of the invention the card sensing means 28 is integrally formed together with the mechanical unlocking means 27, and in particular integrally with the lever 70 of said mechanical unlocking means 27. In accordance with the invention a sensing pin 80 extends oppositely to the spring anchoring pin 73 and extends through the above mentioned opening 37 to the lower surface 12 of the frame 2. Due to the force of the spring 74 the sensing pin 80 engages a lateral edge of the card 5 were the card 5 is inserted into the chip-card reader 1. When the card 5 is pulled out of the chip-card, then lever 70 can pivot due to the force of spring 74 and abuts with a sufficient force with its impact portion 71 on an abutment surface 66 of the pivot lever 60. As a consequence of the pivotal movement of lever 70 in a counter clockwise direction the locking surface 63 releases the locking surface 57 so that the coupling element 19 is moved by the force of the spring 56 in a direction against the direction of insertion of the card. This has the consequence that the carriage 16 which had so far been locked by the card abutment portion 54 is released and moves into its start position, so that it is possible to insert again a card 5 into its reading position.

In connection with the electrical sensing means 26 a card position sensor 50 (see FIG. 2) is provided. The card position sensor 50 supplies a signal indicating that the card is in the reading position and it also supplies another signal to the unlocking means 26 if the card leaves its reading position so as to initiate an unlocking operation.

Industrial Applicability

For an explanation of the operation of the chip-card reader 1 of the invention particular attention is drawn to FIGS. 7 through 10.

At the time when no chip card 5 is inserted into the chip-card reader 1 the carriage 16 is in abutment with the abutment surface 40 of the frame 2 (see FIG. 2). This is due to the fact that the carriage spring 18 excerts a pulling force onto the carriage projection 17 which is integrally formed with said carriage 16. Further, at this time the coupling element 19 is biased by mean of the coupling element spring 56 in a direction against the direction of insertion of a card 5 into the chip-card reader. Consequently, the coupling element 19 is in abutment with an abutment surface provided by the frame 2. For instance, coupling element 19 could abut with its abutment member 53 at an abutment surface of the frame 2. This is not specifically shown in the drawing and, indeed, the position of the coupling element 19 in its start position, i.e. without a card 5 being inserted is not shown in any of the drawings but is clear to a person skilled in the art. With the coupling element 19 in its start position just described lever 70 is in abutment with its cam surface 75 at the abutment surface 58 of the coupling element 19. Indeed, lever 70 is biased anti clockwise into this condition by its spring 74. In this start position where no card 5 is yet inserted, the pivot lever 60 is biased by its spring 65 with its abutment surface 66 against an abutment surface 59 of the coupling element 19.

After this introduction, referring now to FIG. 7 through 10, assume a chip card 5 is inserted through insert slot 4 by a person using the chip-card reader 1. Initially, the card 5 engages when it is inserted the card abutment portion 54 (see FIG. 2) of the coupling element 19. When the insertion of the card 5 is continued, the coupling element 19 is moved over a small distance until the coupling element 19 also moves the carriage 16. This initial movement of the coupling element 19 over a small distance makes it possible that the lever 70 can carry out a small pivotal movement, such that the card sensing pin 80 comes into engagement with a lateral edge of the card 5. Eventually, for a continued movement of the card 5 into the reading position, the locking surface 63 of the pivot lever 60 engages the locking surface 57 of the coupling element 19 such that the carriage 16 is locked together with the card 5 in the reading position.

In case there exists no power failure, then, when the card is pulled out of the reading position the card position sensor 50 supplies an electrical signal to this effect to the release magnet 68. This causes the release magnet 68 to be energised with the consequence that the lever 60 is attracted by the release magnet 68 and the lever 60 moves counter clockwise. This counter clockwise movement of the lever 60 causes that all the components described like the coupling element 19, the unlocking means 27 and the carriage 16 return to their respective initial positions.

In a situation of a power failure, the card 5 can be pulled out manually inasmuch as the card 5 projects outwardly from the insert slot 4 when the card is in the reading position. While the card 5 is pulled out of the chip-card reader 1, one of its lateral edges slides or moves along the sensing pin 80 which is in abutment with said lateral edge due to the force of spring 74. As soon as the sensing pin 80 is no longer in abutment with said lateral edge during the pull out operation of the card 5, the lever 70 hits, due to the force of the spring 74 with its impact portion 71 the abutment surface 66 and thus pivots the pivot lever 60. The pivot lever 60 is pivoted such that the locking edge 63 is released from the locking surface 57 so that the coupling element 19 and carriage 16 can return to their starting position. When this happens the spring 74 is tensioned due to the movement of the coupling element 19 caused by spring 56.

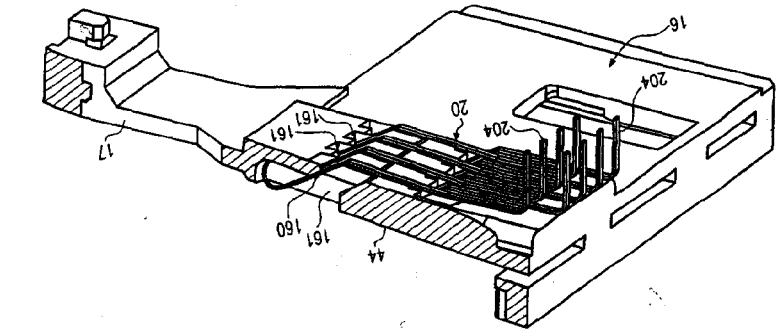

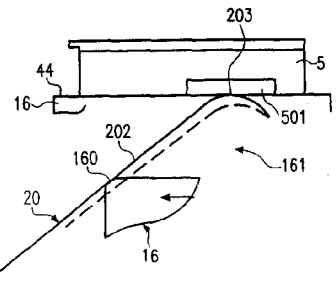

What is claimed is:

1. A contacting apparatus for a smart card having smart card contacts, the contacting apparatus comprising:
   a frame in which are fixedly mounted contact elements for contacting the smart card contacts;
   a carriage adapted to receive the smart card and reciprocally mounted in said frame, the carriage being movable between a start position in which the contact elements are retracted, and a reading position in which the carriage engages said contact elements so as to move them into contact with the smart card contacts;
   said carriage comprises edges formed by slots and said edges engage said contact elements when said carriage is moved into said reading position so as to move said contact elements into a position where they contact the smart card contacts and wherein each said contact element comprises an essentially linear portion, an inclined portion angled relative to said linear portion, and cusps at the end of said inclined portion, and wherein said inclined portion engages one of the edges in said carriage when carriage is moved into said reading position;
   mechanical locking means mounted on said frame and adapted to lock said smart card directly or indirectly in a reading position on said frame in which said contact elements contact the smart card contacts of the inserted smart card; and
   a mechanical unlocking means provided on said frame and adapted to unlock said locking means when said smart card is moved out of said reading position.

2. The smart card contacting apparatus in accordance with claim 1, comprising
   electrical unlocking means for unlocking the locking means, in addition to said mechanical unlocking means.

3. The smart card contacting apparatus in accordance with claim 2, wherein said mechanical unlocking means operates, during a non-actuation of said electrical unlocking means as a result of a lack of power, to remove said smart card from said contacting apparatus and wherein said contact elements are not damaged by repeated insertion of the smart card.

4. The smart card contacting apparatus in accordance with claim 1, wherein the unlocking of the locking means also unlocks said carriage from said reading position to enable said carriage to move back to said start position in which said contact elements are retracted.

5. The smart card contacting apparatus in accordance with claim 1, comprising an electrical card sensing means and/or a mechanical card sensing means.

6. The smart card contacting apparatus in accordance with claim 5, wherein the mechanical card sensing means is moved into a card sensing position due to insertion of said smart card and is moved out of said sensing position when said smart card is removed.

7. The smart card contacting apparatus in accordance with claim 5, wherein the mechanical card sensing means and the mechanical unlocking means are formed as a single piece.

8. The smart card contacting apparatus in accordance with claim 1, wherein said carriage cooperates, via a coupling element, with the locking means and the electrical unlocking means and/or the mechanical unlocking means.

9. The smart card contacting apparatus in accordance with claim 8, wherein said coupling element is in the form of a locking slider.

10. A contacting apparatus for a smart card having smart card contacts, the contacting apparatus comprising:
    a frame in which are mounted contact elements for contacting the smart card contacts;
    a carriage adapted to receive the smart card and reciprocally mounted in said frame, the carriage being movable between a start position in which the contact elements are retracted, and a reading position in which the carriage engages said contact elements so as to move them into contact with the smart card contacts;
    said carriage comprising edges formed by slots and said edges engage said contact elements when said carriage is moved into said reading position so as to move said contact elements into a position where they contact the smart card contacts and wherein each said contact element comprises an essentially linear portion, an inclined portion angled relative to said linear portion, and cusps at the end of said inclined portion, and wherein said inclined portion engages one of the edges in said carriage when said carriage is moved into said reading position;
    a pivot lever mounted on said frame and adapted to lock said smart card directly or indirectly in a reading position on said frame in which said contact elements contact smart card contacts of said inserted smart card; and
    a mechanical card sensing means adapted to be moved into a card sensing position due to the insertion of said smart card and adapted to be moved out of said sensing position when said smart card is removed, for actuating a mechanical unlocking means provided on said frame and adapted to unlock said locking means when said smart card is moved out of said reading position.

11. The smart card contacting apparatus in accordance with claim 10, comprising electrical unlocking means for unlocking the locking means, in addition to said mechanical unlocking means.

12. The smart card contacting apparatus in accordance with claim 11, comprising an electrical card sensing means and/or a mechanical card sensing means.

13. The smart card contacting apparatus in accordance with claim 10, wherein the unlocking of the locking means also unlocks said carriage from said reading position to enable said carriage to move back to said start position in which said contact elements are retracted.

14. The smart card contacting apparatus in accordance with claim 13, wherein said mechanical unlocking means operates, during a non-actuation of said electrical unlocking means as a result of a lack of power, to remove said smart card from said contacting apparatus and wherein said contact elements are not damaged by repeated insertion of the smart card.

* * * * *

UNITED STATES PATENT AND TRADEMARK OFFICE
CERTIFICATE OF CORRECTION

PATENT NO.   : 6,382,508 B1
DATED        : May 7, 2002
INVENTOR(S)  : Robert Bleier It is certified that error appears in the above-identified patent and that said Letters Patent is hereby corrected as shown below:

The title page should be deleted to appear as per attached title page.

The sheets of drawings consisting of figures 1-12, should be deleted to appear as per attached figures 1-12.

Signed and Sealed this

Twenty-sixth Day of November, 2002

Attest:

Attesting Officer

JAMES E. ROGAN
Director of the United States Patent and Trademark Office

(12) United States Patent
Bleier

(10) Patent No.: US 6,382,508 B1
(45) Date of Patent: May 7, 2002

(54) CONTACTING APPARATUS FOR A SMART CARD

(75) Inventor: Robert Bleier, Bad Wimpfen (DE)

(73) Assignee: Amphenol-Tuchel Electronics GmbH (DE)

( * ) Notice: Subject to any disclaimer, the term of this patent is extended or adjusted under 35 U.S.C. 154(b) by 0 days.

(21) Appl. No.: 09/208,253

(22) Filed: Dec. 9, 1998

(30) Foreign Application Priority Data

Dec. 10, 1997 (DE) .......................................... 197 54 914

(51) Int. Cl.$^7$ .................................................. G06K 7/06
(52) U.S. Cl. ...................... 235/441; 235/486; 235/451; 235/479; 235/485
(58) Field of Search ................................ 235/441, 486, 235/451, 475, 477, 479, 485, 492; 361/737

(56) References Cited

U.S. PATENT DOCUMENTS

| | | | | |
|---|---|---|---|---|
| 4,141,044 A | * | 2/1979 | Kistner et al. | 235/475 |
| 4,258,253 A | * | 3/1981 | Fisher | 235/439 |
| 4,724,310 A | * | 2/1988 | Shimamura et al. | 235/483 |
| 4,835,375 A | * | 5/1989 | Shimamura et al. | 235/479 |
| 4,926,032 A | * | 5/1990 | Shimamura et al. | 235/441 |
| 5,131,516 A | * | 7/1992 | Clough | 235/381 |
| 5,317,138 A | * | 5/1994 | Togawa | 235/440 |
| 5,378,884 A | * | 1/1995 | Lundstrom et al. | 235/441 |
| 5,780,827 A | * | 7/1998 | Zolkos et al. | 235/441 |
| 5,898,159 A | * | 4/1999 | Huang | 235/441 |
| 5,912,446 A | * | 6/1999 | Wong et al. | 235/449 |
| 5,984,184 A | * | 11/1999 | Kojima | 235/441 |
| 6,149,064 A | * | 11/2000 | Yamaoka et al. | 235/479 |

* cited by examiner

*Primary Examiner*—Karl D. Frech
*Assistant Examiner*—Uyen-Chau N. Le
(74) *Attorney, Agent, or Firm*—Black Rome, LLP

(57) ABSTRACT

A smart card contacting apparatus comprising: a frame in which contact elements are mounted, a locking element mounted on the frame and adapted to lock a smart card directly or indirectly in a reading position on the frame in which the contact elements contact smart card contacts of the inserted smart card, and a mechanical an unlocking elements provided on the frame and adapted to unlock the locking means when the smart card is moved out of the reading position.

14 Claims, 9 Drawing Sheets